Dec. 5, 1967

P. D. HANN ETAL 3,356,459

COUNTER-CURRENT LIQUID-LIQUID EXTRACTOR WITH EMULSION LAYER REMOVAL

Filed June 18, 1964

INVENTORS
P. D. HANN
R. E. DIXON

BY Young & Quigg

ATTORNEYS

United States Patent Office 3,356,459
Patented Dec. 5, 1967

3,356,459

COUNTER-CURRENT LIQUID-LIQUID EXTRACTOR WITH EMULSION LAYER REMOVAL

Paul D. Hann and Rolland E. Dixon, Bartlesville, Okla., assignors to Phillips Petroleum Company, a corporation of Delaware Filed June 18, 1964, Ser. No. 376,131
7 Claims. (Cl. 23—270.5)

ABSTRACT OF THE DISCLOSURE

The uncoalesced particles which tend to build up at the interface between two at least partially immiscible liquids in a liquid-liquid contacting column are removed by entrainment with lighter liquid flowing upward at high velocity through a conduit having a small, substantially uniform cross-sectional area.

This invention relates to a process and apparatus for contacting liquids. In another aspect, this invention relates to a process and apparatus for contacting liquids wherein the emulsion formed at the interface of the contacting liquids is removed as formed from the contact zone.

In many processes, it is desirable to contact two liquid phases which are characterized in that an interfacial tension is developed between the two phases producing an emulsion at the interface. Conventionally, multistage contact vessels, divided into zones by perforated plate, vertically disposed within the said vessels, are employed in absorption, scrubbing and other liquid-liquid contacting processes.

In some multistage liquid-liquid contactors, adjacent zones are connected by conduits passing through each perforated plate, conducting the undispersed liquid phase to the next contact zone. In those instances wherein the less dense liquid phase is the continuous phase, the less dense liquid phase is conducted from the liquid-liquid interface upwardly through the connecting conduit to the next high zone. It is desirous that separation of the liquids be complete within each of the contact zones prior to the passage of the less dense liquid phase upwardly through the conduit to the next contact zone. In an effort to aid separation, it has been proposed in the art that the flow of the separated less dense liquid phase upwardly from the lower contact zone to the next upper contact zone be restrictively channeled so as to separate any of the more dense liquids entrained with the less dense liquid phase.

This method of liquid-liquid contacting is disadvantageous in that interfacial foam, or emulsion, is also separated from the upflowing less dense liquid phase. This foam or emulsion continues to build up within each of the contact zones, forming a deposit within each of the contact zones and substantially reducing the effectiveness of the liquid-liquid contacting vessel. Operation of the liquid-liquid contacting vessel under these circumstances must be periodically interrupted to clean out the accumulated deposit.

Accordingly, an object of our invention is to provide an improved liquid-liquid contacting process and apparatus therefor.

Another object of our invention is to provide a liquid-liquid contacting process and apparatus therefor wherein emulsion formed at the liquid-liquid interface in each stage of a multistage contacting vessel is passed upwardly through the contact vessel and withdrawn from the upper contact stage.

Other objects, advantages and features of our invention will be readily apparent to those skilled in the art from the following description, the drawing and appended claims.

By our invention, we have provided a liquid-liquid vertical contacting vessel having multiple perforated plates, each of said perforated plates forming contacting zones in the column on opposite sides of said plate, a first vertical conduit extending above and below said plate and having an open end in each of said contact zones, and a second vertical liquid conduit having a substantially uniform cross-section but of lesser cross-sectional area than said first vertical conduit and extending above and below said plate, each open end of said second conduit having a cross-sectional area substantially equal to the cross-sectional area of said second conduit, said second conduit extending below said plate and opening into said contact zone adjacent to said first conduit and slightly above the open end of said first conduit.

In a first embodiment, said second conduit extending above said plate opens into said first conduit.

In a second embodiment, said second conduit extending above said plate opens into said contact zone.

Figure 1:
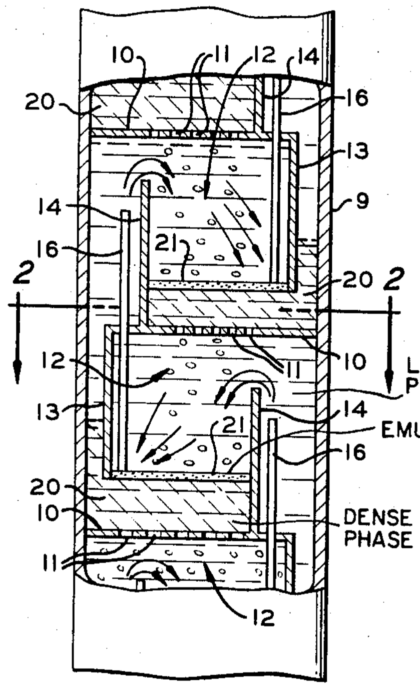
FIGURE 1 is an elevation view partly in cross-section of one embodiment of the invention wherein the more dense liquid phase is dispersed in a less dense liquid phase.
Figure 2:
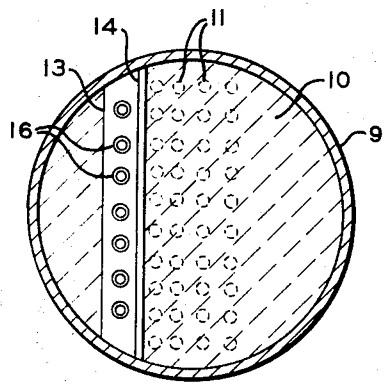
FIGURE 2 is a view of the embodiment of FIGURE 1 along the lines 2—2.

Referring to FIGURES 1 and 2, in which corresponding parts have the same numbers, a portion of a vertical column comprising three perforated plates 10 in combination with accompanying conduits as hereinafter described is illustrated. Outer shell 9 of the column will usually be cylindrical but can have any shape and will be fabricated to withstand the pressure and temperature conditions that may exist within the column. Plates 10 containing preforations 11 are horizontally disposed within shell member 9 and are attached to the interior of shell member 9 so that no substantial flow of liquids will occur between stages other than through the channels provided as hereinafter described. Plate members 10 are perforated such that the perforations provide passageways communicating between adjacent contact zones as hereinafter described. Preferably, although not to be limited thereto, the perforations within the said plate members 10 are so positioned so as to prevent the passage of a liquid through the plate member of a liquid directly into a conduit. Preferably, each of said plate members 10 is vertically positioned a distance ranging from about 7 to about 24 inches from the next adjacent plate member and each of the perforations 11 will have an orifice diameter in the range of 0.1 to 0.5 inch.

Contact zones 12, wherein the downwardly falling dispersed more dense liquid phase is contacted with the upwardly rising less dense liquid phase, are formed by upper and lower plate members 10, vertical baffle members 13 depending downwardly from upper plate members 10, and vertical baffle members 14 extending upwardly from lower plate members 10. Vertical baffle members 13 and 14, as illustrated, extend across the cross-section of shell member 9 as illustrated in FIGURE 2. As illustrated, vertical baffle members 13 and 14 with shell 9 form conduits communicating betwen adjacent contact zones 12, said conduits hereinafter referred to as first conduits. It is within the scope of this invention to utilize other means for forming said first conduits such as pipe sections positioned in said plate members 10. It is also within the scope of this invention to employ multiple first conduits in each of said plate members. The distance between the bottom edge of the first conduit and the next lower plate member 10 is in the range of 2–8 inches. The distance between the upper edge of the first conduit and the next higher plate member 10 is in the range of 2–8 inches. Baffle members 13 and 14 can comprise separate baffles attached to plate members 10 or each pair of baffles 13 and 14 can comprise a single baffle extending above and below each of said plate members 10.

Multiple vertical liquid transfer conduits 16 extend above and below each of said plate members 10, each of said vertical liquid transfer conduits 16, hereinafter referred to as second conduits, having a substantially uniform cross-section and an open end at each end of said vertical liquid transfer conduit having a cross-section substantially equal to the cross-section of said vertical liquid transfer conduit 16. Preferably, conduits 16 leading to the next upper contact zone are positioned adjacent baffle members 13 and 14 and apart from conduits 16 leading to the next lower contact zone so as to provide maximum contact between the upflowing less dense phase with the downwardly flowing more dense phase before passage of the less dense phase to the next upper contact zone. Preferably, each of said vertical liquid transfer conduits 16 is circular shaped and the length of each of said vertical liquid transfer conduits 16 shall range from about 8–24 inches.

Baffle member 13 extends below vertical liquid transfer conduits 16 and preferably the first conduit member will extend a vertical distance below conduits 16 ranging from 1 to 4 inches. The first conduit extends above conduits 16 and should preferably extend a vertical distance ranging from about 1 to 4 inches above the top opening of vertical liquid transfer conduits 16. Preferably, the inside diameter of each of said vertical liquid transfer conduits 16 shall range from 0.1 to 0.5 inch. A ratio of the cross-sectional area of the first conduit formed by vertical baffle members 13 and 14 to the total cross-sectional area of vertical liquid transfer conduits 16 shall preferably be in the range of 40:1 to 60:1. The ratio of the cross-sectional area of the perforated openings in plate members 10 to the total cross-sectional area of vertical liquid transfer conduits 16 shall preferably be in the range of 25:1 to 50:1.

Figure 3:
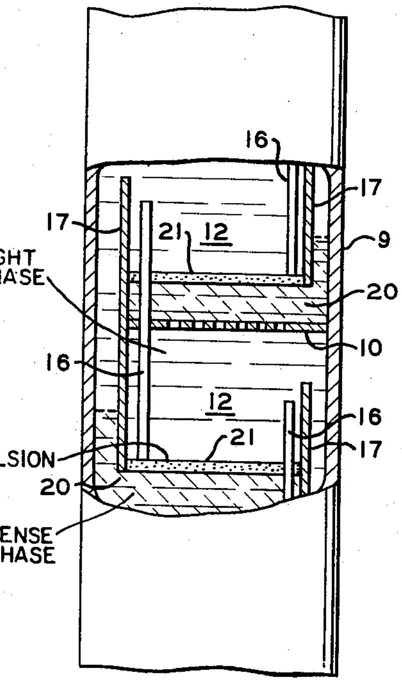
FIGURE 3 is an elevation view partly in cross-section of a second embodiment of the invention wherein the more dense liquid phase is dispersed in a less dense liquid phase.

As illustrated in FIGURE 1, the upper end of each of said vertical liquid transfer conduits 16 opens into the conduit formed by shell member 9 and vertical baffle member 14. The lower opening of vertical liquid transfer conduit 16 is in communication with the next adjacent lower contact zone 12. Referring to FIGURE 3, a second embodiment of the invention is therein illustrated. Corresponding parts in FIGURES 1 and 3 have the same numbers. As illustrated in FIGURE 3, each of the vertical liquid transfer conduits 16 opens directly into contact zones 12 above and below plate member 10. As further illustrated in FIGURE 3, vertical baffle member 17 is a continuous baffle member extending above and below plate member 10 and in communication with plate member 10.

In operation of the embodiment illustrated in FIGURE 1, the more dense liquid phase 20, acting as the dispersed phase, forms a layer immediately above plate member 10 and passes downwardly through perforations 11 as subdivided droplets. The less dense continuous phase passes upwardly through vertical liquid transfer conduits 16 and discharges into the conduit formed by shell member 9 and baffle member 14 into the top of each contacting zone 12. The less dense liquid phase passes downwardly and laterally as indicated through the contact zone 12 and enters the bottom of the vertical liquid transfer conduit 16 leading to the next upper and adjacent conduit formed by shell member 9 and vertical baffle member 14.

As illustrated in FIGURES 1 and 3, the more dense liquid phase forms a layer as previously described upon each of said plate members 10 and as further illustrated, forms a backup head in the conduit formed by vertical baffle member 13 and shell member 9. This backup head or more dense liquid on plate member 10 is balanced by the pressure drop within vertical liquid transfer conduit 16 so that a desired level of more dense liquid is maintained continuously on plate member 10 and the less dense liquid phase flows upwardly solely through vertical liquid transfer conduits 16 to the above adjacent contact zone.

By our invention, the carrying over of the more dense and less dense liquid phases between contact zones is eliminated. The more dense liquid phase 20 which passes downwardly through perforations 11 into the next adjacent zone will not be entrained in the less dense liquid phase passing upwardly to the next adjacent contact zone. This prevents overloading the column normally caused by recirculating the material between zones.

The interphase contact between the more dense liquid phase and the less dense liquid phase effected within the contact zone between the falling droplets of the more dense liquid phase and the flowing less dense liquid phase results in the desired transfer of material or energy between the droplets and the less dense liquid phase. This turbulent contact causes a dispersion or emulsion 21 of uncoalesced particles of one liquid phase in the other liquid phase to occur at the interface between them. This interfacial emulsion unless removed will result in the formation of deposit within the column and cause shut down of the column to clean out the column and remove the formed deposit.

By our invention, emulsion 21 is removed from the contact zone as formed and passed upwardly through vertical liquid transfer conduit 16 to the next upper contact zone and to succeeding upper contact zones in a like manner until the emulsion is removed from the top or upper region of the column. The interfacial emulsion is swept from the lower contact zone by the less dense liquid phase flowing downwardly and across the said lower contact zone and the said emulsion is caused to flow upwardly through vertical liquid transfer conduits 16 with the less dense liquid phase, each of said vertical liquid transfer conduits 16 having a substantial uniform cross-section, to the next upper contact zone. The smooth even flow of less dense liquid and interfacial emulsion through vertical liquid transfer conduits 16 prevents the hold up and subsequent build-up of interfacial emulsion in the lower contact zones.

As illustrated in FIGURES 1 and 3, the height or depth of this interfacial emulsion 21 is controlled by the positioning of the lower opening of each of vertical transfer conduits 16 above plate member 10. The maximum depth of the emulsion 21 is set by the vertical distance extending between the bottom opening of vertical conduits 16 and the layer of the more dense liquid phase 20 on plate member 10.

The invention is broadly applicable to the contacting of two liquids having different densities. The invention is thus applicable to liquid-liquid contacting processes such as the solvent extracton of butenes and butadienes from a $C_4$ hydrocarbon stream employing a solvent such as furfural. Although not to be limited thereto, the invention will hereinafter be described as applied to a specific solvent extraction process wherein a solvent (triethylene glycol) is employed to extract aromatic hydrocarbons from hydrocarbon feed mixtures.

In the example the liquid-liquid contacting column of FIGURES 1 and 2 is a vertical column 90 feet in height, 8 feet in diameter and containing 60 perforated trays with the vertical spacing between adjacent trays of 16 inches. The diameter of each perforated tray orifice is 0.25 inch with a total orifice cross-sectional area per tray of 575 inches $^2$.

Each of said vertical liquid transfer conduits 16 comprises a pipe 20 inches in length having an inside diameter of 0.25 inch. The total cross-sectional area of the vertical liquid transfer conduits 16 extending through each plate member 10 is 16 inches $^2$. The ratio of the cross-sectional area of the perforated tray orifices for each plate member 10 to the total cross-sectional area of the vertical liquid transfer conduits 16 extending through each of said plate members 10 is 36:1.

The vertical distance between the lower edge of baffle member 13 and the next adjacent lower plate member 10 is 4 inches. The vertical distance between the upper edge of vertical baffle member 14 and the next adjacent plate member 10 is 4 inches. The cross-sectional area of the conduit formed by baffle member 13 and shell member 9 is 700 inches $^2$. The ratio of cross-sectional area of the conduit formed by baffle member 13 and shell member 9 to the total cross-sectional area of vertical liquid transfer conduits 16 is 44:1. The lower opening of each of vertical liquid transfer conduits 16 is positioned a distance of 2 inches above the lower edge of baffle member 13. The upper edge of baffle member 14 is positioned 2 inches above top opening of each of said vertical liquid transfer conduits 16.

A petroleum hydrocarbon fraction containing 51.4 volume percent aromatic hydrocarbon and having an API gravity of 52.0 is introduced into the 38th tray from the bottom of the vertical liquid-liquid contacting column (containing 60 trays) at the rate of 200 barrels per hour. The petroleum hydrocarbon fraction has an initial boiling point of 150° F., a 50 volume percent distillation point of 210° F., and an end point of 300° F. at atmospheric pressure. Triethylene glycol containing 8 volume percent water, as a solvent, is introduced into the top of the liquid-liquid contacting column (on top tray 60) at the rate of 1,000 barrels per hour. A temperature of 260° F. is maintained within the liquid-liquid contacting column. A pressure of 135 p.s.i.g. is maintained within said column.

A raffinate is withdrawn from the top of the column having an API gravity of 76.4 and containing 3.6 volume percent aromatic hydrocarbons. The raffinate has an initial boiling point of 145° F., a 50 percent distillation point of 170° F., and an end point of 295° at atmospheric pressure. The raffinate recovered from the liquid-liquid contacting column comprises 50.4 volume percent of the petroleum hydrocarbon feed to the liquid-liquid contacting column.

An extract comprising triethylene glycol and aromatic hydrocarbon separated from the petroleum hydrocarbon feed is withdrawn from the bottom of the liquid-liquid contacting column. The aromatic hydrocarbons are individually separated from the tirethylene glycol by distillation. Analysis of the product aromatic hydrocarbons separated from the triethylene glycol solvent produces the results listed below in Table I. 200 barrels per hour of the product aromatic hydrocarbon is returned to the bottoms of the column as reflux.

TABLE 1

| | Benzene | Toluene | Mixed Xylenes[1] |
|---|---|---|---|
| Volume percent aromatic hydrocarbons | 99.9 | 99.8 | 99+ |
| Distillation: | | | |
| IBP | 175.5 | 230.4 | 276.9 |
| 50 volume percent | 176.2 | 231.4 | ---------- |
| End point | 176.5 | 231.8 | ---------- |
| Volume percent of hydrocarbon charge to liquid-liquid contacting column | 7.6 | 21.2 | ---------- |
| Volume percent of extract | 15.3 | 42.8 | 41.9 |

[1] Mixed xylenes, ethy benzene and $C^9$+ aromatic hydrocarbons.

As will be evident to those skilled in the art, various modifications of this invention can be made, or followed, in the light of the foregoing disclosure, without departing from the spirit or scope thereof.

We claim:

1. In a liquid-liquid contacting column having upper liquid inlet and outlet means, lower liquid inlet and outlet means, and multiple horizontal perforated plates forming contacting zones on the opposite side of each of said plates, the combination, comprising a first vertical liquid conduit extending above and below each of said plates and having an open end in each of said contacting zones; and at least one second vertical liquid conduit, said second liquid conduit having open ends, substantially uniform cross-sectional area over the entire length, and smaller cross-sectional area than said first conduit; the open end of the second conduit extending above each of said plates being below the open end of said first conduit extending above each of said plates, the open end of the second conduit extending below each of said plates being above the open end of said first conduit extending below each of said plates, and the ratio of the cross-sectional area of said second liquid conduit to the cross-sectional area of said first liquid conduit being in the range of 1:40 to 1:60.

2. The apparatus according to claim 1 comprising multiple said second liquid conduits with the ratio of the total cross-sectional area of said multiple second liquid conduits to said first liquid conduit being in the range of 1:40 to 1:60.

3. The apparatus according to claim 2 wherein said open end of each of said second liquid conduits extending below said plate is positioned above said open end of said first conduit extending below said plate a distance in the range of 1 to 4 inches.

4. The apparatus according to claim 3 wherein the inside diameter of said second liquid conduit is in the range of 0.1 to 0.5 inch.

5. The apparatus of claim 1 wherein said second open end of said second liquid conduit extending above each of said plates opens into said first liquid conduit, and said open end of said second liquid conduit extending below each of said plates opens into said contact zone adjacent said first liquid conduit.

6. The apparatus of claim 1 wherein said open end of said second liquid conduit extending above each of said plates opens into said contact zone adjacent said first liquid conduit, and said open end of said second liquid conduit extending below each of said plates opens into said contact zone adjacent said first liquid conduit.

7. The apparatus of claim 2 wherein the ratio of the total cross-sectional area of the perforated openings in each of said plates to the total cross-sectional area of said multiple second liquid conduits is in the range of 25:1 to 50:1.

References Cited

UNITED STATES PATENTS

| | | | |
|---|---|---|---|
| 2,191,919 | 2/1940 | Thayer | 23—270.5 |
| 2,647,855 | 8/1953 | Grunewald | 196—14.52 X |
| 2,895,809 | 7/1959 | Pohlenz | 23—270.5 |
| 2,902,413 | 9/1959 | Kassel | 23—310 X |
| 2,909,414 | 10/1959 | Gerhold | 23—270.5 |
| 3,179,712 | 4/1965 | Carson | 23—270.5 |

NORMAN YUDKOFF, *Primary Examiner.*

S. EMERY, *Assistant Examiner.*